April 13, 1965   W. H. PETERSON   3,178,035
SHOCK ABSORBING ARRANGEMENT
Filed May 1, 1963   10 Sheets-Sheet 1

INVENTOR.
WILLIAM H. PETERSON
BY Wayne Morris Russell
HIS ATT'Y.

April 13, 1965 W. H. PETERSON 3,178,035
SHOCK ABSORBING ARRANGEMENT
Filed May 1, 1963 10 Sheets-Sheet 2

INVENTOR.
WILLIAM H. PETERSON

April 13, 1965 W. H. PETERSON 3,178,035
SHOCK ABSORBING ARRANGEMENT
Filed May 1, 1963 10 Sheets-Sheet 8

INVENTOR.
WILLIAM H. PETERSON

United States Patent Office 3,178,035
Patented Apr. 13, 1965

3,178,035
SHOCK ABSORBING ARRANGEMENT
William H. Peterson, Homewood, Ill., assignor to Pullman Incorporated, Chicago, Ill., a corporation of Delaware
Filed May 1, 1963, Ser. No. 277,190
10 Claims. (Cl. 213—8)

The present invention relates to shock absorbing arrangements and more particularly to shock absorbing arrangements employed in railway vehicle construction.

The shock absorbing arrangements employed in railway vehicles serve to protect the structure and the lading supported by the vehicle from the impact forces to which the vehicle is subjected during use. In the standard railway car this is accomplished by means of draft gear associated with the couplers. However, design limitations are generally such that the travel of the draft gear must be maintained relatively short, say for example a total travel of about five inches, and thus does not provide anything approaching reasonable protection for a wide variety of category of ladings. Such catagories of lading may include those which are compactable and subject to permanent deformation upon impact. This category of lading may be designated as resilient lading in contrast to lading which is rigid and not readily subject to damaging deformation. It is the resilient lading which is the most susceptible of being damaged by the cushioning inadequacies of draft gear.

In providing protection for both rigid and resilient lading long travel cushion underframe cars arranged in accordance with my Patent 3,003,436, granted October 10, 1961, have proven to be particularly satisfactory. These cushion underframe cars employ a sliding sill mounted on the underframe for lengthwise movement of the car. The sliding sill supports the couplers on the ends thereof. A cushion device having the closure characteristics described in said patent is interposed between the underframe and the sliding sill for interaction therewith and is operative to achieve the desired lading protection by functioning with the principles of said patent. The cushion device, and also the sliding sill, will thus have a travel in the range of from about 20 to about 40 inches in either direction and the cushion device will have the force travel closure characteristics specified in said patent.

The sliding sills as above described are slidably supported on the underframe but otherwise are structurally detached from the car body. Under these circumstances, the sliding sill must be capable of withstanding without failure the loads imposed thereon by impacts at the couplers encountered during use. In this connection it should be mentioned that the compression loading which is imposed on the sliding sill, as during humping and switching of cars or run-ins of slack during train operation, is considered to be critical and under certain conditions may tend to cause failure of the sliding sill by bending or in compression.

Heretofore, sliding sills employed in railway cars have been reinforced in order to withstand the loading imposed thereon. The reinforced structure has the primary disadvantage of increasing the overall weight of the car. Moreover, the reinforced structure of the sliding sill is such that it cannot be readily accommodated within the limited space provided by the conventional Z-26 type center sill which is generally employed in a conventional uncushioned car construction.

In my U.S. patent application Serial No. 196,320, filed May 21, 1962, there is disclosed a cushion underframe railway car construction which embodies a sliding sill construction and cushioning arrangement for protecting a sliding sill so that the latter may be formed of minimum cross-sectional area and be accommodated within the conventional Z-26 center sill structure. This is accomplished generally by employing a sliding sill construction including end-to-end sections movable lengthwise relatively to each other between a vertical spaced position assumed during normal operations, a contracted buff position, and an extended draft position assumed upon buff and draft respectively. This sliding sill construction obviates the necessity of draft gears at ends of the sill for mounting the couplers, and utilizes a single resilient shock absorbing unit disposed to coact upon impact causing the sill sections to be moved to either the draft or buff positions thereof to absorb a portion of the shock impact. The single resilient shock absorbing unit is disposed so as to relieve the stresses imparted through the length of the two sections of the sliding sill. Furthermore, the lading protection cushion device, which preferably is of the type disclosed in said Patent 3,003,436, and which is disposed to interact between the sliding sill and the car body, and serves to provide lading and car body protection, is arranged so that an increment of its full travel is utilized at least upon relative movement of the sill sections to their buff position to protect the sill itself. The sliding sill sections, the shock absorbing unit which reduces the stresses through the length of the sliding sill, and the lading protection cushion device are associated such that the energy absorbing capacity of the sill shock absorber unit and the underframe cushion unit are simultaneously employed to relieve the stresses through the sliding sill as the sill sections move to their limit positions assumed upon a buff or draft impact. Thereafter, the sill sections are movable in unison relative to the underframe so that the full travel of the lading protection cushion unit is employed to protect the lading supported on the car body.

In the cushion underframe arrangement described above utilizing the end-to-end sectioned sliding sill wherein a resilient shock absorbing unit and a portion of the travel of the lading protection cushion device is employed to achieve sliding sill protection, the closure characteristics of the shock absorbing unit and cushion device make these devices sufficiently responsive at relatively low impact speeds that the sill sections are moved relatively to each other. This may result in an undesirable run-in and run-out of slack during normal train action.

Such run-in and run-out of slack may also occur in draft gears, especially those of the type employed to achieve a greater degree of lading protection and utilizing travels in excess of the 2 to 3 inches normally employed.

Accordingly, it is an object of the present invention to provide a shock absorbing arrangement for absorbing a portion of the shock of impact at the couplers in a manner minimizing the run-in and run-out of slack during normal train action.

This is accomplished generally by the provision of a shock absorbing arrangement including a shock absorbing device associated with the coupler carrying structure of the car which is constructed such that no travel of the unit occurs at the relatively low impact or coupler forces encountered during normal train action and is responsive and movable to travel upon impact forces of higher magnitude. The impact coupler force at which the shock absorbing unit is operative is selected such that the impact forces below the selected value are readily withstood by the car structure and such that the unit upon becoming operative is adequate to provide cushioning over its full length of travel that is adequate to maintain impact force level below that causing structural damage.

In carrying out the present invention the shock absorbing device referred to immediately above is constructed to provide a high impact energy absorbing capacity and comprises essentially a friction wedge energy dissipating assembly including a plurality of longitudinally movable and opposing pairs of friction shoes having opposed sloped friction faces accommodating therebetween transversely movable friction wedges which are biased by means of pre-loaded springs exerting a force on the wedges precluding relative movement of the wedges and friction shoes until the impact force applied on the unit is greater than that applied by the preloaded springs; whereupon the unit is rendered operative to travel and absorb sufficient energy to protect the structure with which it is associated from damage resulting from the impact force.

It is another object to provide a shock absorbing device constructed and arranged to include a plurality of lengthwise spaced and longitudinally movable friction shoes having opposed sloping friction faces accommodating coacting friction wedges therebetween and including predeterminately loaded spring means biasing the friction wedges to prevent the device from being operative until an impact force overcoming the biasing force is applied.

Another object of the invention is to provide a friction wedge shock absorbing device constructed and arranged to have substantially constant resisting force during each increment of travel thereof.

Still another object is to provide a friction-wedge shock absorbing device constructed and arranged to have substantially constant resisting force during each increment of travel thereof and to be inoperative until an impact force of a selected magnitude is applied thereon.

It is still another object to provide a shock absorbing device for use in a sliding sill of a cushion underframe railway car for protecting the sliding sill from damage resulting from impact wherein the shock absorbing device is constructed and arranged to be operative at impact forces in excess of those encountered during normal train action so as to minimize the run-in and run-out of slack.

It is still another object to provide a shock absorbing device for use in a cushion underframe railway car for protecting the sliding sill from damage resulting from impact wherein the shock absorbing device is constructed and arranged to include a plurality of lengthwise spaced and longtiudinally movable friction shoes having opposed sloping friction faces accommodating coacting friction wedges therebetween and having predeterminately spring means biasing the wedge means to prevent the device from being operative until the impact force on the sill is a selected magnitude substantially greater than that encountered during normal train action.

It is still a further object to provide a sliding sill of a cushion underframe railway car wherein the sliding sill is formed in end-to-end sections movable relatively to each other and to the underframe and employing a shock absorbing device interacting with the sliding sill sections for protecting the sliding sill from damage and being operative only at impacts to the sliding sill above those encountered during normal train action and thereby preventing relative movement between the sliding sill sections resulting in excessive run-in and run-out of slack.

Further objects and features will hereinafter appear.

In the drawings:

FIG. 8 is a fragmentary schematic elevational cross-sectional view similar to FIG. 3 showing the relative positions of the sections of the sliding sill to each other and to the center sill in the neutral or normal position thereof.

Referring now to FIGS. 1–7, the cushion arrangement of the present invention is shown illustrated in an underframe 10 of a railway car 11. The underframe includes a center sill 12, the usual bolsters 13, cross bearers 14, end sills 16, and side sills 17. Mounted on the underframe 10 for lengthwise movement thereof is a sliding sill 18 and operatively disposed between the latter and the underframe 10 for interaction therewith is a hydraulic cushion device 19 which serves to provide lading and car body protection.

Figure 1:
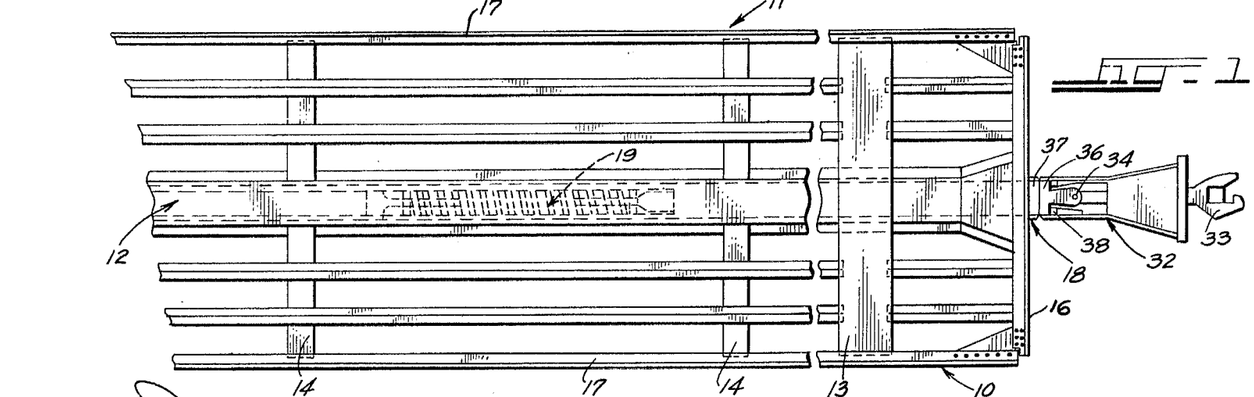
FIG. 1 is a fragmentary top plan view of a cushion underframe railway car embodying the present invention.
Figure 2:
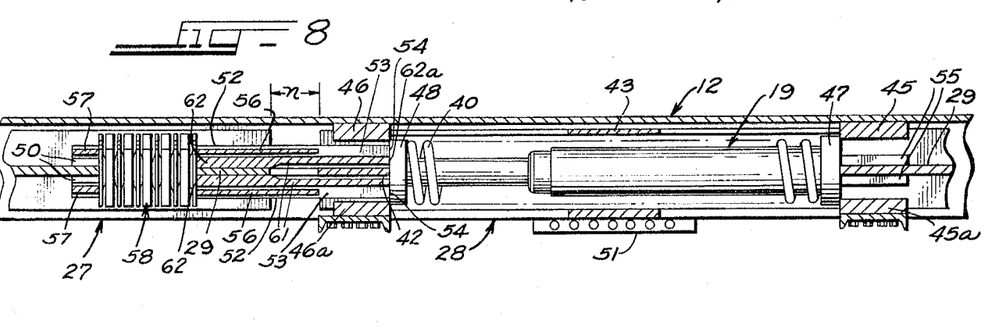
FIG. 2 is an exploded view of the stationary center sill and the sliding sill structure of the railway car shown in FIG. 1.
Figures 3, 4, 5, 6:
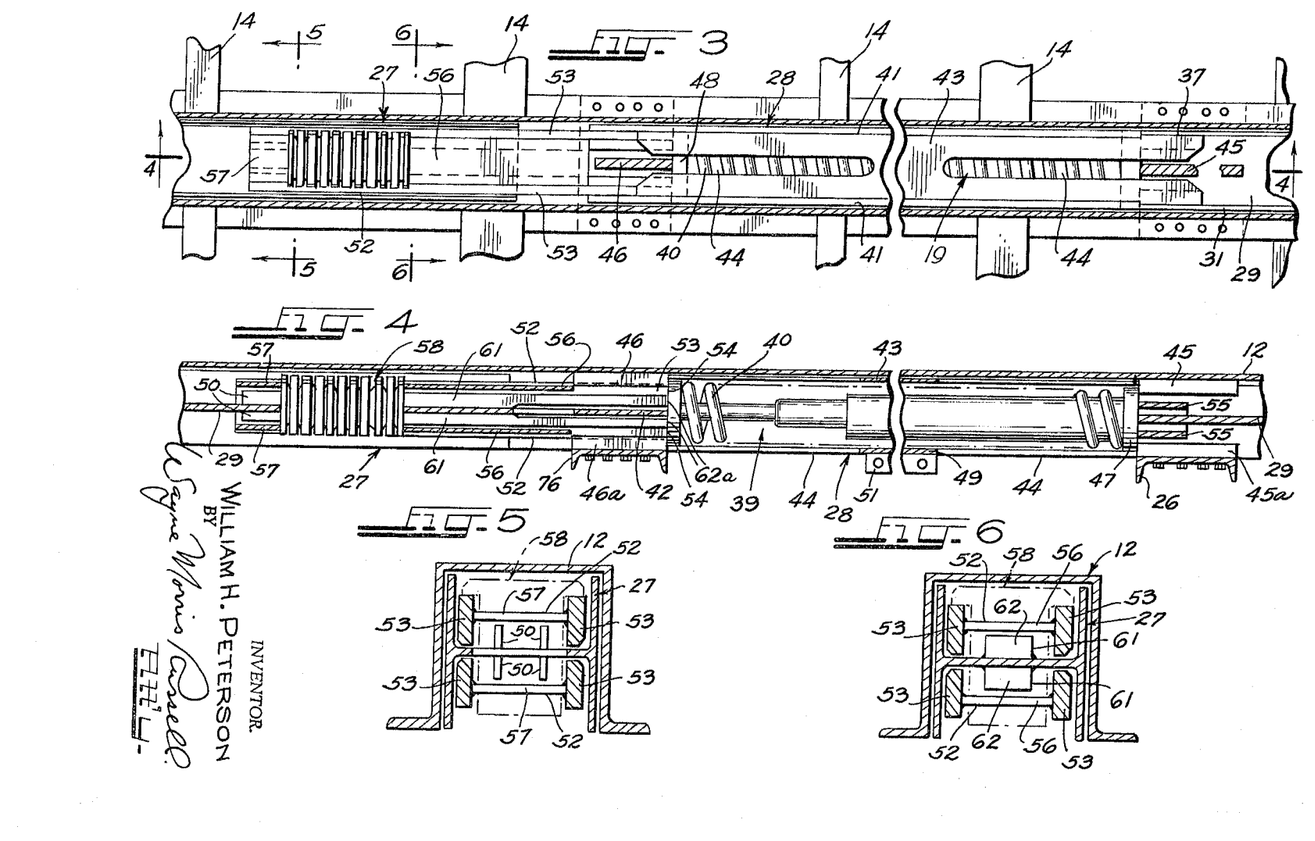
FIG. 3 is a fragmentary top sectional view taken through the underframe and showing the relative positions of the components in the neutral position.
FIG. 4 is a cross-sectional view taken substantially along the lines 4—4 of FIG. 3.
FIG. 5 is a cross-sectional view taken substantially along the lines 5—5 of FIG. 4.
FIG. 6 is a cross-sectional view taken substantially along the lines 6—6 of FIG. 4.
Figure 7:
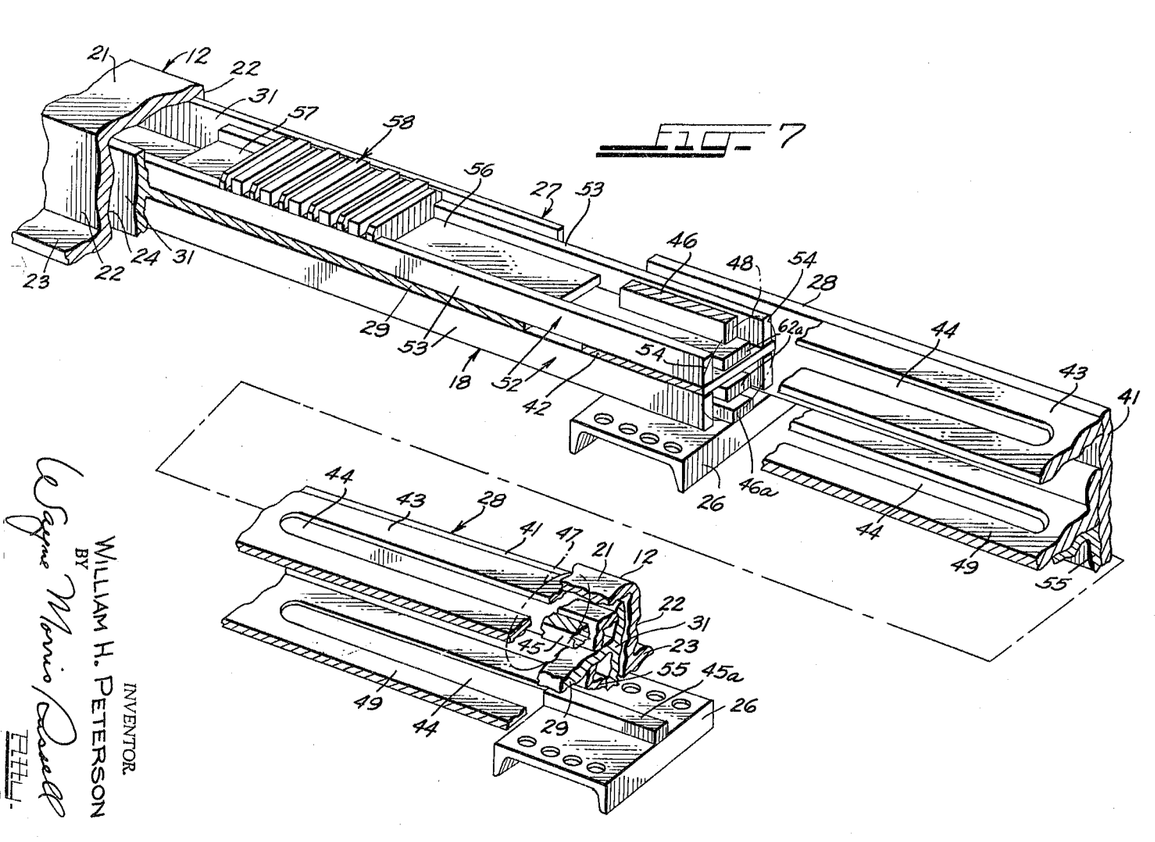
FIG. 7 is a fragmentary isometric view of the stationary sill and the sliding sill disposed therein with some of the parts being broken away to show underlying details of structure.

As best shown in FIG. 7 the stationary center sill 12 may be a standard Z–26 center sill including a horizontal web 21 from either side of which there extends vertical webs 22 terminating at their lower ends in outwardly extending horizontal flanges 23. The sliding sill 18 is disposed within the center sill enclosure 24 and slidably supported therein by means of channel member 26 detachably secured along the underside of the stationary sill 22 across the horizontal flanges 23. To facilitate sliding movement of the sliding sill 18 there are provided wear plates, not shown, fixed in complementary relationship along adjacent surfaces.

As shown, the sliding sill 18 is formed into two end-to-end lengthwise movable sections 27 and 28. Each of the sections 27 and 28 may be formed from columns of H-section. The center sill 18 is disposed within the center sill 12, so that the horizontal web 29 thereof lies in the close proximity to the coupler line of draft and the vertical webs 31 lie in close sliding proximity to the vertical webs 22 of the stationary center sill 12. Fixed to the remote ends of each of the sections 27 and 28 are coupler housings 32 (FIG. 1) for mounting the couplers 33 thereon. The coupler 33 is attached for swing movement by way of a coupler pin 34 carried by a coupler support 36 disposed between a tie plate 37 fastening the housing 32 to the sliding sill 18 and stops 38 fixed in the housing 32. For a more detailed description of the coupler housing 32 and mounting structure reference is made to the aforementioned Peterson application 196,320.

As heretofore discussed, in conventional uncushioned railway car structure draft gears are conventionally employed to mount each of the couplers on the sill for the purpose of protecting the structure of the car body. However, in the cushion underframe railway car as clearly illustrated by the above described structure, the sliding sill 18 is substantially detached from the car body so that the impact force at the couplers 33 is assumed almost entirely by the structural components of the sliding sill and the resulting stresses are not distributed through the other structural components of the car body as in conventional uncushioned railway car construction. It is for this reason, namely, for relieving the stresses through the sliding sill, that it has been the general practice to provide sliding sills with draft gears associated with each of the couplers. As more fully to be set forth hereinafter, the structure of the present invention does not require a draft gear at each end thereof.

As shown in FIGS. 2, 3, 4 and 7, the cushion device 19 for achieving lading protection is disposed in a cushion pocket formed in the sliding sill section 28. The cushion pocket may be formed as a weldment including transversely spaced vertical plates 41 fixed at one end to the inner ends of the vertical webs 31 of the H-column. Disposed across the vertical plates 41 is a horizontal web plate 42 which is spaced from the horizontal web 29 of the H-column to receive the extended length of the cushion device 19. Fixed across the upper ends of the vertical plates 41 is a top cover plate 43 having longitudinally extending slots 44 formed in each end thereof for accommodating stop lugs 45 and 46 fixed to the stationary center sill 12 and which engage and coact with the follower plates 47 and 48 respectively of the cushion device 19 as more fully to be explained hereinafter. Similar stop lugs 45a and 46a spaced complementary to the stop lugs 45 and 46 are fixed to the sliding sill supporting channels 26. A bottom cover plate 49 having longitudinal slots 44a for accommodating the stop lugs 45a and 46a is detachably secured across the bottom of the pocket 39 by means of bolts fastened through downwardly depending flanges 51 on the bottom cover plate 49 and vertical plates 41.

The cushion device 19 may be a hydraulic unit which is operative upon contraction caused by the application of impact thereto at the followers to provide a force resisting contraction and thereby to afford protective cushioning. The cushion unit 19 is preferably of the type disclosed in said Patent 3,003,436, and has a total closure travel in either direction from the neutral extended position shown in the range of from between about 20 to about 40 inches, preferably 30 inches, and unit 19 is preferably arranged to provide during such travel a substantially constant resisting force during each increment of travel, from the extended neutral position, such that the magnitude of the forces acting on the lading as a result of the impact is maintained at levels below that causing damage to the lading. The cushioning means or device 19 illustrated includes a spring means 40 disposed between the follower plates 47 and 48 for returning the device to its normal extended position after the impact force has been dissipated.

Fixed to the sliding sill section 28 for movement therewith are a pair of yoke assemblies or members 52 disposed on opposite sides of the horizontal web 29 and plate 42 and overlying the other sliding sill section. The yoke members 52 each include straps 53 fixed to the vertical webs of the section 28 along one end portion thereof lie at the end of the cushion pocket for engagement with the cushion follower plate 48. The terminal ends 54, thus serve as stops. The lengths of the straps 53 extending beyond the end of the sill sections 28 are spaced from the inner walls of the vertical webs 31 and the horizontal web 29 of the sliding sill section 27 to permit free relative movement of the sections in a manner more fully to be explained hereinafter.

Extending across each of the oppositely disposed pairs of straps 53 inwardly of the ends thereof is a horizontal buff key 56 in the form of a plate. Extending across the ends of each of the straps 53 and forming the bight portion is a draft key 57 also in the form of a plate. The buff and draft keys 56 and 57 are spaced lengthwise so as to embrace a shock absorbing unit 58 mounted in an opening 59 formed in the sill section 27.

Fixed on opposite sides of the horizontal web 29 of the sill section 27 for movement therewith are pusher bars 61. The terminal faces 62 of the attached end of each of the bars 61 in in alignment with the inner edges of the cushion receiving opening 59. The pusher bars 61 are arranged to extend into the sill section 28 and are disposed in spaced relation with the horizontal web plate 42 thereof and in the neutral position of the sill sections 27 and 28 the terminal ends 62a extending into the sill section 28 abut the cushion follower 48 as shown, for example, in FIG. 4.

The shock absorbing unit 58, as shown in particular in FIGS. 12 through 16, includes generally a plurality of friction shoes 63 and 66 having disposed therebetween friction wedge assembly 64. The sloping surfaces of friction faces 67 of the shoes 63 are sloped outwardly relative to a plane normal to the longitudinal plane passing through the center of the assembly. As shown the inboard and outboard end friction shoes 66 are each formed with two friction faces 67 on the inner sides thereof. The intermediate shoes 63 are formed with friction faces 67 on both sides thereof arranged in opposing relationship to the friction faces 67 on an adjacent one of the friction shoes 63 or inboard and outboard shoes 66.

Figure 12:
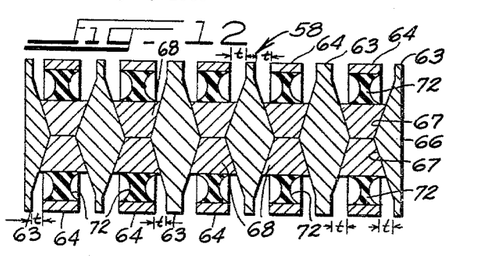
FIG. 12 is a vertical cross-sectional view of one form of shock absorbing device embodying the present invention shown in the neutral or extended position.
Figures 13, 14, 15, 16:
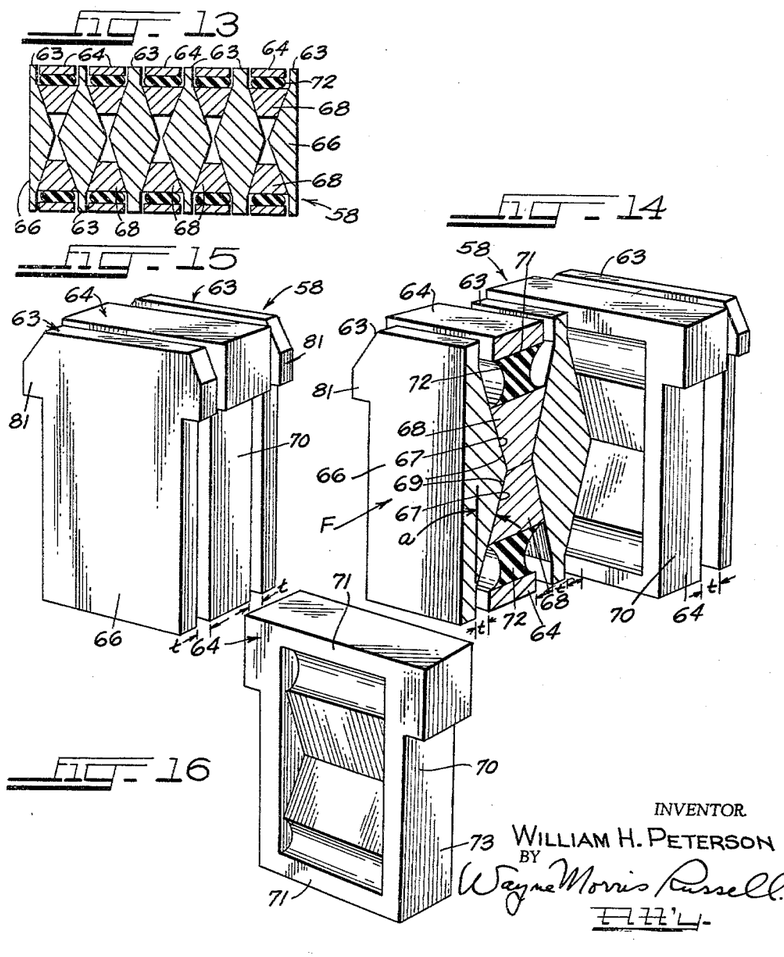
FIG. 13 is a vertical cross-sectional view similar to FIG. 12 but shown in the contracted position thereof.
FIG. 14 is an isometric view of a shock absorbing device illustrated in FIG. 12 partially in section but showing only two sets of friction shoes coacting with two friction wedge assemblies.
FIG. 15 is an isometric view of a shock absorbing device with a single set of friction shoes coacting with a single friction wedge assembly.
FIG. 16 is an isometric view of a friction wedge assembly.

The friction wedge assemblies 64 disposed between the friction shoes 63 are each of similar construction and include wedge blocks 68 of trapezoidal section of which the friction faces 69 thereof are sloped complementary to the opposing friction shoe faces 67 so as to maintain full surface contact therewith over the full length thereof. The wedge blocks 68 are arranged on opposite sides of the central longitudinal plane of the assembly 64.

Supporting the wedge blocks 68 are frame members 70 to the opposing end walls 71 of which there is suitably fixed a resilient means 72 biasing the respective wedge blocks 68 toward each other such that the blocks 68 are in abutting relationship along the central longitudinal plane. In this position the wedge blocks 68 are operative to maintain the friction shoes 63 at the maximum horizontal spacing $t$ shown in FIG. 12.

In accordance with the present invention the resilient biasing means 72 is selected to apply a predetermined biasing force on the wedge blocks 68 and to maintain the assembly inoperative until the impact force applied thereon is of a certain selected magnitude tending to cause damage to the structure being protected thereby. That is to say the shock absorbing means is maintained inoperative until the magnitude of the impact force is above that which tends to create damage to the sliding sill 18. In the embodiment of the invention disclosed in FIGS. 12 through 16 the resilient biasing means 72 is in the form of a resilient rubber pad. The rubber pads 72 are bonded along one side to the respective frame end walls 71 and along their other side to the respective wedge blocks 68.

As shown in FIGS. 12 to 16, the friction faces 67 and 69 are formed as inclined plane having a fixed angle of inclination, $a$, and the friction faces 67 and 69 of the friction shoe 63 and wedge block 68 are formed to provide a substantially constant coefficient of friction for the full length of sliding movement of the wedge blocks 68 on the friction shoes 63. Knowing the angle of inclination $a$ and the coefficient of friction $u$ the desired resisting or biasing forces of each of the springs 72 of the cushion pad assemblies may be obtained from the relationship $$F = S\frac{u \tan a + 1}{\tan a - u}$$

wherein F is the impact force above which the sliding sill structure is subject to stresses tending to cause damage and S is the biasing spring force.

Thus, when the shock absorbing assembly 58 is subjected to a shock impact at either of the end shoe follower surfaces 66 at a magnitude equal to or above the force F, the biasing force S of the springs or rubber pads 72 is overcome. This results in the wedges 68 moving laterally away from each other and the friction shoes 63 traveling longitudinally toward each other to the position shown in FIG. 13. As the device is operating a portion of the energy of the impact is dissipated as heat at the friction faces 67 and 69 and a minor portion is absorbed by the compression of the rubber springs 72. The total energy absorbing capacity of the shock absorbing unit 58 is of course determined by the area under the force travel relation of the resisting force and the length of travel from the fully extended position shown in FIG. 12 to the contracted position in FIG. 13. The travel of the unit may be changed by either increasing or decreasing the number of friction shoes 63 and wedge assemblies 64 so that the total of the individual travels $t$ as shown in FIG. 12 is equal the total desired travel. Thus, the units shown in FIG. 15 having only two friction shoes 63 and a single wedge assembly 64 has a total travel of $2t$ while the units illustrated in FIGS. 12 and 14 have travels of $10t$ and $4t$ respectively.

As above explained, a portion of the impact energy is absorbed by the compression of the spring pad 72. Inherently, springs of this type when compressed provide a variable resisting force of increasing magnitude which results in the unit having a force travel closure characteristic wherein the resisting force is of gradually increasing magnitude.

In FIGS. 17 through 21 there is shown a second embodiment of a friction wedge shock absorbing unit 258 wherein the shock absorbing capacity is maintained at a maximum by constructing and arranging the unit such that the resisting force thereof is maintained more nearly constant for each increment of travel thereof. This is accomplished generally by varying the angle of inclination of the sloping friction surfaces to compensate or correct for the increase in force resulting from the compression of the rubber pads.

As above described in connection with the embodiment of the shock absorbing unit disclosed in FIGS. 12 through 16, the resisting force S of the rubber pads F increases as the latter is compressed such that the relationship $$F = S\frac{u \tan a + 1}{\tan a - u}$$

is not maintained constant over the full length of travel of the device. Inasmuch as the coefficient of friction $u$ of the friction faces is fixed at a substantially constant value and the impact force F is, of course, independent of the structure employed, only the angle of inclination of the friction faces may be varied.

To this end the shock absorbing unit 258 includes a plurality of friction shoes 263 in spaced relationship between which there are disposed wedge sub-assemblies 264. The friction shoes 263 each include friction faces 267 disposed on opposite sides of a longitudinal plane extending through the unit 258. The friction faces 267 are sloped outwardly relative to a plane normal to the longitudinal plane and the faces on each of the adjacent shoes are arranged to slope toward the other so as to provide a wedge block accommodating space therebetween.

The wedge block sub-assemblies 264 are each of similar construction and include the wedge blocks 268 disposed on opposite sides of the longitudinal plane passing through the unit and have friction faces 269 sloped complementary to the friction shoe friction faces 267. Fixed to the outer side of each of the wedge blocks 268 is one end of a resilient spring means 272 of which the other end is fixed to the inner end wall 271 of a rectangular frame member 273.

As shown, the resilient spring 272 means includes a plurality of rubber pads 272a separated by metallic plates 272b. The spring means 272 is selected to provide an initial resisting force rendering the device inoperative until a predetermined impact force is applied thereto by use of the formula set forth above.

Figure 22:
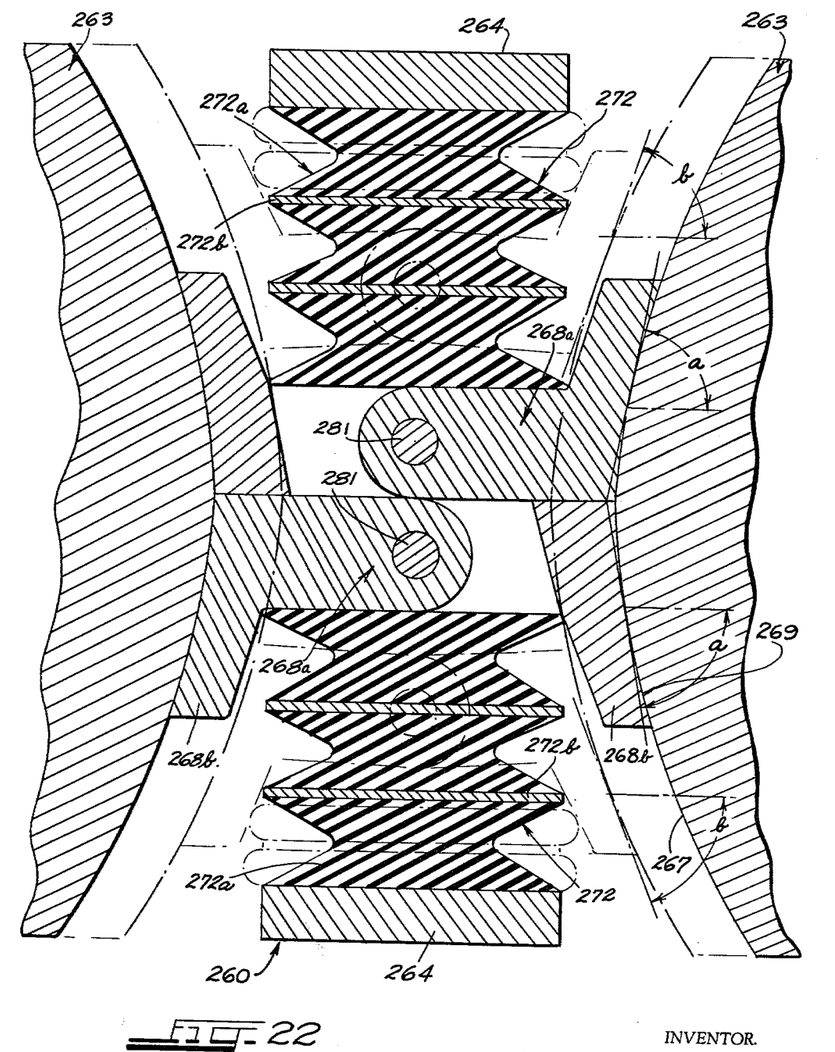
FIG. 22 is an enlarged fragmentary vertical sectional view of one set of friction wedge units in the normal position and showing in phantom lines the contracted position thereof.

To maintain the resisting force of the cushion friction wedge unit 258 more nearly constant as the rubber springs are compressed between the extended preloaded position shown in full lines and the compressed position shown in phantom lines in FIG. 22, the friction faces 267 and 269 are formed as the circumference of circular arcs. The center of the circular arcs are determined such that the initial angle of inclination $a$ and the final angle of inclination $b$ (FIG. 22) corresponding to the initial position and fully compressed positions, respectively, of the rubber pads 272 are such that as can be seen in the expression for cushion force, $$F = S\frac{u \tan a + 1}{\tan a - u}$$

when the force on the rubber pads, S increases to its fully compressed value and with a given friction coefficient $u$, the angle $a$ is changed to a selected lesser value $b$ so that F at full cushion closure is essentially the same as it was at the beginning of closure. In this manner the resisting force of the shock absorbing device is maintained more nearly constant for each unit of travel thereof so that a maximum energy absorbing capacity is achieved at a minimum force.

The wedge blocks 268 are each formed in two wedge members 268a and 268b each having an arcuate friction surface or face 269 formed thereon. The wedge member 268a is formed with space hinge ears 274 which are turnably nested within a complementary receiving groove 276 formed in the other wedge member 268. Extending from the wedge member 268b is a hinge leaf 277 which is received within the cut-out 278 between the hinge ears 274. Mounted in the hinge ears 274 and extending through an opening in the hinge leaf 277 is a hinge pin 281. This hinged construction of the wedge block 268 permits the friction faces 269 thereof to remain in full surface contact with the shoes' friction faces 267 for the full extent of relative movement therebetween.

In operation, therefore, upon application of shock having impact to either of the end follower surfaces 266 of the friction shoes 263, resulting in an impact F causing the rubber springs 272 to be compressed, the friction shoes 263 are longitudinally compressed and the friction wedge blocks 268 are displaced laterally against the force of the rubber spring 272. During lateral displacement of the friction wedge block 268 the arcuate friction faces 269 on the wedge members 268a and 268b remain in contact with the complementary arcuate friction faces 267 of the friction shoes 263 such that as the angle of inclination of the friction surface decreases from $a$ to $b$ there results an increase in the mechanical advantage which substantially offsets the increasing spring force so that a substantially constant resisting force is maintained throughout the length of travel of the shock absorbing unit 58. The desired total travel of the shock absorbing unit 258 is obtained by using a sufficient number of friction shoes 263 and coacting friction wedges 268 such that the total sum of the increment travels is equal to the desired travel.

Either of the shock absorbing units 58 or 258 may be disposed in the opening 59 of the sliding sill section 27 depending on whether it is desired to utilize the gradually increasing resisting force travel closure characteristic of the unit 58 or the substantially constant force travel closure characteristic of the unit 258. In the illustrated cushioning arrangement for the purpose of explanation the unit 58 is employed for relieving the stresses imposed on the sliding sill structure. It should be kept in mind, however, that the shock absorbing unit 258 may also be employed and that it coacts with the sliding sill structure in the same manner and differs from the shock absorbing unit 58 only in the manner in which the friction wedge faces 267 and the friction shoe faces 269 thereof function to achieve the substantially constant force travel closure characteristics.

The shock absorbing unit 58 is disposed in the opening 59 of the sliding sill section 27 and supported on the web 29 by means of ear-like projections 81 formed on the upper ends of the friction shoes 63 and frame 70. The shock absorbing unit 258 may also be provided with ear-like projections 281. Engaging the follower surfaces 66 of the inboard friction shoes 63 are the ends of the pusher bars 61 which serve as stops and engaging the outboard follower surface 66 are stops 55 fixed to web 29.

In the normal extended position of the sliding sill sections 27 and 28 as shown in FIG. 8, the shock absorbing unit 58 is in its extended or inoperative position. The sill sections 27 and 28 are spaced apart a distance $n$ and the cushion device 19 is in its extended position with the follower plates 47 and 48 engaging the respective underframe stops 45–45a and 46–46a and also the sliding sill stops 55 and 54 such that the sliding sill is maintained in a neutral position relative to the car body or underframe 11. Also, the draft and buff plates or keys 56 and 57 on the yokes 52 which are mounted for movement with the sliding sill section 28 are engageable with the outboard and inboard follower surfaces 66, respectively, of the shock absorbing device 58 and the pusher bars 61 fixed for movement on the sill section 27 engage at their fixed ends the inboard follower surface 66 and at its free terminal end 62a the follower plate 47 of the cushion unit 19.

Assuming that the structure of the sliding sill 18 is such that it is readily able to withstand impact forces up to about 750,000 lbs. applied at the couplers without imposing failure causing stresses therein, and that the rubber springs 72 within the shock absorbing device 58 exert a biasing force on the friction faces 67 and 69 thereof to render the device 58 inoperative until the impact forces approaching the maximum stresses, say for example, between 300,000–500,000, preferably 400,000, any application of an impact force at the follower surfaces 66 of the unit 58 above about 400,000 will cause compression of the device. Assuming further that the neutral spacing $n$ of the sill sections 27 and 28 and the total travel of the shock absorbing device 58 are each equal to about 10 inches and that the travel of the cushion device 19 is about 30 inches in either direction, application of an impact force at the couplers will cause different actions depending on the conditions under which it is applied.

Figure 8A:
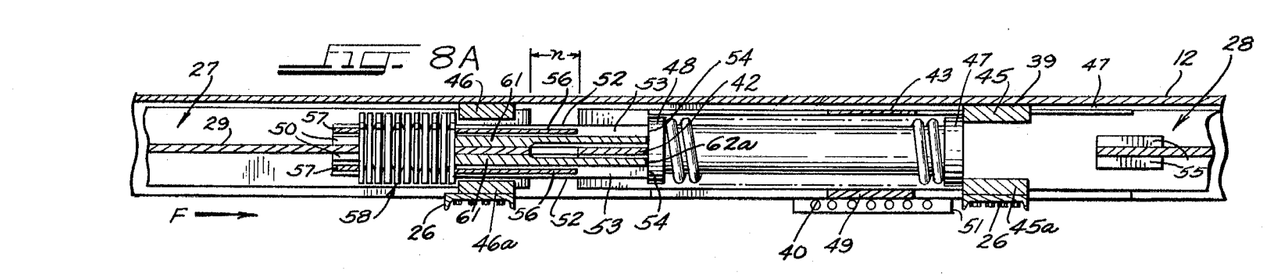
FIG. 8A is a fragmentary schematic elevational view showing the relative position of the components of FIG. 8 where the magnitude of the impact force applied on the sliding sill is insufficient to activate the shock absorbing unit but results in activating the cushioning unit interacting between the sliding sill and stationary sill.

Assuming first that the car embodying the above structure is in a moving train line disposed other than at the end of the line and that the train action is such that a buff impact is applied at the left end coupler as indicated by the force arrow F in FIG. 8A, this force F is transmitted through the sliding sill section 27, the shock absorbing unit 58 mounted on the latter and to the sliding sill section 28 via the yoke 52 fixed thereto and encompassing the shock absorbing unit 58.

In the event that force transmitted to the sill sections 27 and 28 at the shock absorbing device 58 is less than 400,000 lbs., the shock absorbing unit 58 remains inoperative because the resilient rubber pads provide a biasing force on the wedge blocks 68 which applies a force along the friction faces 67 and 69 greater than the force applied therealong by the impact force. Thus, the friction shoes 63 remain stationary in an extended position and the buff keys 56 and draft keys 57 fixed to yokes 52 engaging the follower surfaces 66 of the shock absorbing unit 58 mounted on the sill section 27 serves to tie the latter to the sill section 28 via the yoke straps 53 fixed to the sill section 28.

The sliding sill 18 with the sections 27 and 28 maintained in their extended spaced relationship $n$ under the influence of the shock force F applied thereto moves lengthwise relatively to the underframe 11. During the movement to the right as shown in FIG. 8A, the pusher bars 61 fixed to the sill section 27 and having their terminal ends 62 engaging the follower plates 66 and the horizontal stop plate 42 of the sill section 28 are operative to contract the cushion devices against the stop lugs 45a and 45 fixed to the stationary center sill 12 of the car body underframe 11. Contraction of the cushion device 19 operates to protect lading in accordance with Patent 3,003,436.

Assuming now that the car embodying the construction of the present invention is at the head end of a stationary line of cars and a buff impact force F (FIG. 8) is applied to the left end coupler which is free. If the impact energy is of a magnitude such that the forces transmitted along the length of the sliding sill between the coupler ends thereof is less than 400,000 lbs. and does not create a compression loading tending to create sill damage, the shock absorbing unit remains inoperative so that the sill sections 27 and 28 remain spaced as shown. As above described, the shock absorbing unit 58 remains inoperative because of the pre-loading of the rubber spring pads 72 which compress when the force exceeds 400,000, whereby the yoke 52 encompassing the cushion device 58 and fixed to the sill section 28 remains stationary.

As described above in connection with the running or moving car, the impact for F also tends to move the sliding sill 18 lengthwise of the underframe 11. If such lengthwise movement occurs, the cushion device 19 is activated as previously described. However, under some circumstances the cushion underframe car may be coupled to a stationary line of cars of standard construction and the mass of the latter may be such as to form in the nature of a solid abutment. Under these circumstances the sliding sill is restrained against lengthwise movement such that substantially no relative lengthwise movement occurs between the stationary underframe 11 and the sliding sill 18.

Figure 9A:
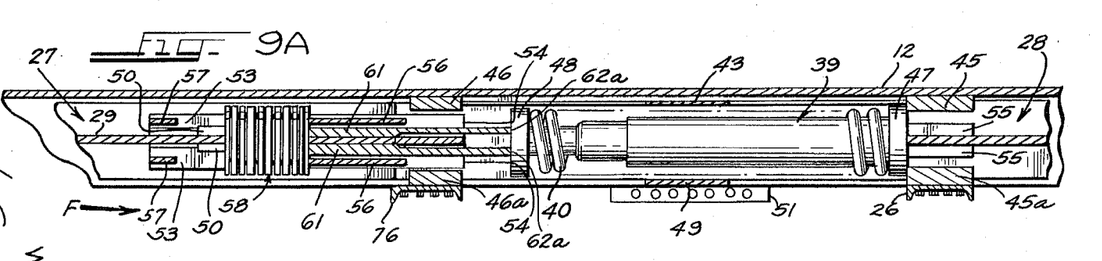
FIG. 9A is a fragmentary schematic elevational cross-sectional view showing the relative position of the sections of the sliding sill to each other and to the stationary center sill upon impact to the left sliding sill causing closure of the shock absorbing unit and with the right sill section restrained against movement to the right.

Assuming now that the impact force F is increased so that force transmitted to the shock absorbing device and at the yoke buff plates 56 via the sliding sill sections 27 and 28 is of magnitude of over 400,000 lbs. overcoming the biasing force of rubber pads 72 and is sufficient to cause the device 58 to be completely contracted, during this travel the full energy absorbing capacity of the shock absorbing unit is employed to protect the sliding sill 18. At the same time, the sill section 27 moves relatively to the sill section 28 until the adjacent ends abut as shown in FIG. 9A and the pusher bars 61 fixed to the moving sill section 27 are operative to compress the cushion units 19 against the sliding sill stops 55 and the underframe stops 46 and 46a. In this manner a portion of the travel of the cushion device 19 may be employed to the extent of the relative travel of the sill sections 27 and 28. Should the sliding sill be connected at its right end coupler to a line of cars forming in the nature of a stationary, abutment, the sliding sill 18 is, of course, restrained against substantial movement relative to the stationary sill 12. When the force of impact has been dissipated the springs 40 of the cushion device 19 acting via the follower plate 45 abutting the pusher bars 61 and the rubber springs 72 of the shock absorbing device are operative to restore the sill sections 27 and 28 to their neutral position.

Figure 9B:
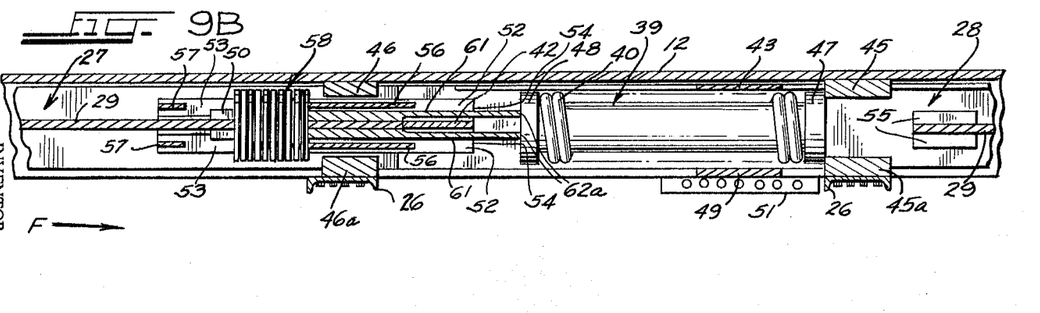
FIG. 9B is a fragmentary schematic elevational view similar to FIG. 9A but showing the relative positions of the components when the right end is not restrained.

In the event that the right end coupler is not restrained against lengthwise movement, the cushion device 19 may complete its full length of travel (see FIG. 9B) through the action of the pusher bars 61 acting as stop keys contacting the follower plate 48 and compressing the cushion device 19 for its full length of travel against the stop lugs 45 and 45a. In this manner the cushion device 19 is operative to perform its heretofore described cushioning functions. As above, when the impact energy has been dissipated the cushion spring 40 and the shock absorbing rubber biasing springs 72 or 272 are operative to return the sliding sill sections 27 and 28 to the neutral position shown in FIG. 8.

It should be apparent that in the event the impact force transmitted to the shock absorbing unit is not of a magnitude causing full travel of the shock absorbing unit 58, the sill sections 27 and 28 travel toward each other from the neutral position to the same extent as the travel of the shock absorbing unit 58. The operation of the sliding sill 18 relative to the car body and the operation of the cushion unit 19 remains unchanged from that described above.

Should a buff impact be applied to the right end of the sliding sill 18 it is, of course, apparent that the structure will function similarly to the buff impact applied at the left end described above with the exception that the movements of the sliding sill sections 27 and 28 and the cushion unit 19 relative to each other and the stationary sill will be toward the left rather than to the right.

Assuming now the conditions wherein the car is again in a moving train line other than at the end thereof, and that during train action a draft force F is applied on the right end or left end of couplers of the sliding sill 28, this tends to pull the sill sections 27 and 28 apart. This causes the yoke draft keys 57 fixed for movement with the sill section 28 to exert a force on the shock absorbing unit at the outboard follower surface 66 tending to compress the shock absorbing unit 58. Should the draft force encountered during train action be less than 400,000 lbs., the shock absorbing unit 58 which is operative only at impact forces above 400,000 lbs., remains extended and maintains the sill sections 27 and 28 in their extended neutral position, n, as shown in FIG. 8.

At the same time, the sill sections 27 and 28 in their extended neutral position, n, are slidably movable in unison in the direction of the force relative to the stationary sill 12. During this movement the respective stops 54 and 55 fixed for movement with the sliding sill and abutting the cushion device follower plates 47 and 48 are operative to compress or contract the follower plates 47 or 48 against the opposing one of the stops 45–45a or 46–46a fixed to the underframe. In this manner, the cushion device 19 is rendered operative to protect the underframe and the lading supported thereon from damage.

Figure 10A:
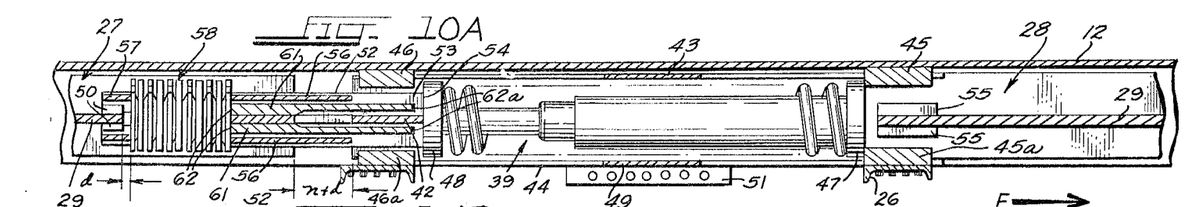
FIG. 10A is an elevational cross-sectional view similar to FIG. 8 showing the relative positions of the components when a draft force is applied on the right sill section causing the shock absorbing device to partially close with the left sliding sill section restrained against movement to the right.

Assuming now that the car is attached at its left coupler to a stationary line of cars and a draft impact force F is applied on the right end, as shown in FIG. 10A, this tends to move the sill section 28 to the right relatively to the car attached sliding sill section 27 so that a force is exerted by the yoke draft keys 57 on the shock absorbing follower surface 66 tending to compress the shock absorbing unit 58. If the force exerted between the draft keys 56 and the shock absorbing units 58 is less than the selected force of 400,000 lbs., which causes the wedge blocks 68 to be displaced laterally against the biasing force of the rubber pads 72, the friction shoes 63 remain in their extendsd position. In this manner, the sill sections 27 and 28 are retained in their spaced neutral position as shown in FIG. 8.

The shock impact force at the same time tends to cause the sliding sill sections 27 and 28 to move in unison to the right relative to the stationary sill 28. In the event that the stationary line of cars at the left end forms in the nature of a solid abutment, the sliding sill 18 is restrained from relative movement. However, if the sliding sill 18 is not restrained as when the force is such that the attached car mass is moved or the sill 18 is connected to sliding sills of other cushion underframe cars, the sliding sill 18 slides lengthwise to the right relative to the stationary center sill 12. During the sliding movement the stops 54 fixed to the sliding sill section 27 and contacting the follower plate 48 are operative to compress the cushion device 19 against the stops 45–45a fixed to the stationary sill 12 such that the cushion device 19 is activated to protect the lading and car body.

Assuming now that an increased draft impact force F of over 400,000 lbs. is applied so that the force transmitted to the outboard follower surface 66 of the shock absorbing device 58 by way of the yoke draft key 57 is greater than the biasing force resisting compression of the unit 58 and is sufficient to cause the device to be partially compressed a distance d as shown in FIG. 10A. During this partial travel d of the shock absorbing device 58 a portion of the impact energy transmitted through the sill is absorbed as hereinbefore described. At the same time the left sill section 28 moves relatively to the right sill section 27 from the neutral position a distance corresponding to the length of travel of the shock absorbing device 58. In connection with the travel of the shock absorbing device 58 it should be noted that as previously discussed, the draft impacts are generally of lesser magnitude than the buff impacts so that generally the full travel and accordingly the full energy absorbing capacity of the shock absorbing device 58 is not utilized or, in fact, required.

Figure 10B:
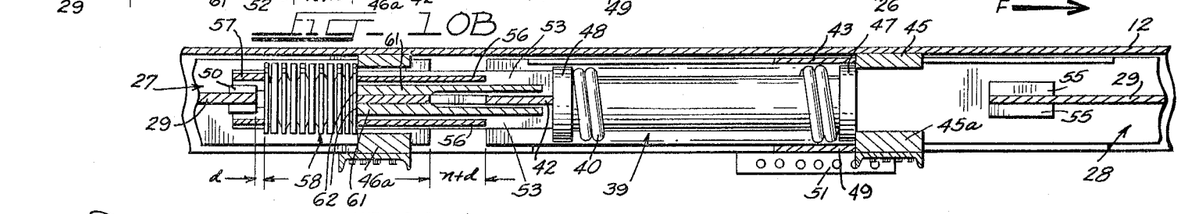
FIG. 10B is an elevational cross-sectional view similar to FIG. 10A with the conditions of the force impact the same but with the left sill section unrestrained.

During the compression of the shock absorbing unit 58 and the movement of the sill sections 27 and 28 outwardly a distance d from the neutral position, the pusher bars 61 are displaced out of contact with the follower plate 48 of the cushion device 19 within the cushion pocket of the sill section 28. Should the conditions be such that the right end of the sliding sill is not held against movement, the sliding sill sections 27 and 28 will move in unison in draft-extended position whereupon the stops fixed to the horizontal web 29 of section 28 and contacting the follower plate 45 are operative to compress the cushion against the stops 46 and 46A of the stationary sill 12 as shown in FIG. 10B. Thus, the cushion device 19 is rendered operative to provide lading and car body protection.

When the force of impact has been dissipated the cushion spring 40 is operative to return the sliding sill to its neutral position relative to the stationary sill 12. The biasing force means within the shock absorbing unit is operative to extend the unit to its original position so that the sill sections are returned to their normal or neutral spaced position.

Figure 11A:
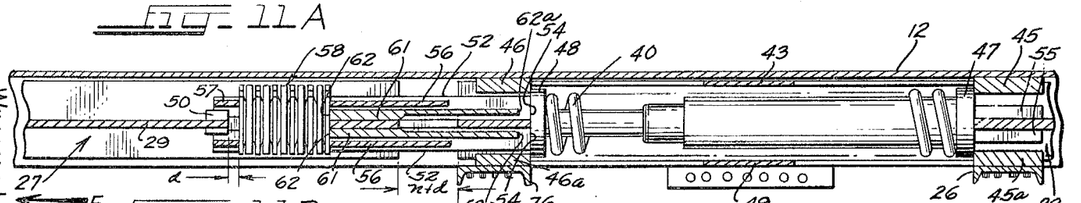
FIG. 11A is an elevational cross-sectional view similar to FIG. 8 showing the relative positions of the components when a draft force is applied on the left sill section causing the shock absorbing device to partially close with the right sliding sill section restrained against movement to the left.
Figure 11B:
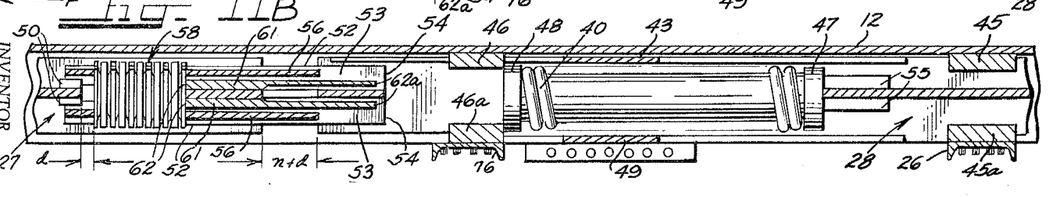
FIG. 11B is an elevational cross-sectional view similar to FIG. 11A with the conditions of the force impact being the same but with the right sill section unrestrained.

Assuming now that the car is attached at its right coupler and to a stationary line of cars and a draft force is applied on the left end as shown in FIG. 11A, this tends to move the sill section 27 to the left relatively to car attached sliding sill section 28 so that a force is exerted by the draft keys 57 to compress the shock absorbing unit 58. As described above in connection with the draft force applied at the right end, if the force F is less than 400,000 lbs. the shock absorbing unit 58 remains inoperative so that the sill sections 27 and 28 remain spaced a distance $n$. Also, if the sliding sill 18 is not restrained the sill sections 27 and 28 move in unison relative to the stationary sill 12 so that the cushion device 19 is operative in a manner similarly to that described above in connection with the draft force applied at the right end.

If the draft force F is greater than 400,000 lbs., the shock absorbing unit 58 is contracted by movement of the sill section 27 carrying the shock absorber 58 to the right against the draft keys 57 which are fixed to the sill section 28 attached to the stationary line of cars. As illustrated in FIG. 11A, the device may be contracted or travel a distance $d$. Thereafter the sill sections 27 and 28 spaced the distance $n-d$ are movable in unison relative to the center sill 12. However, in the event the mass of the stationary cars is such that it restrains movement of the sliding sill 18, the latter will remain stationary in the position shown in FIG. 11A. If the mass connected to the sliding sill 18 is such as not to restrain movement thereof, during such movement the stops 55 fixed thereas and abutting the follower 47 of the cushion device 19 contracts the latter against the stationary sill stops 47. In this manner the cushion device 19 is rendered operative to perform its function. Upon dissipation and transfer of the impact force the cushion springs are operative to return.

Figure 17:
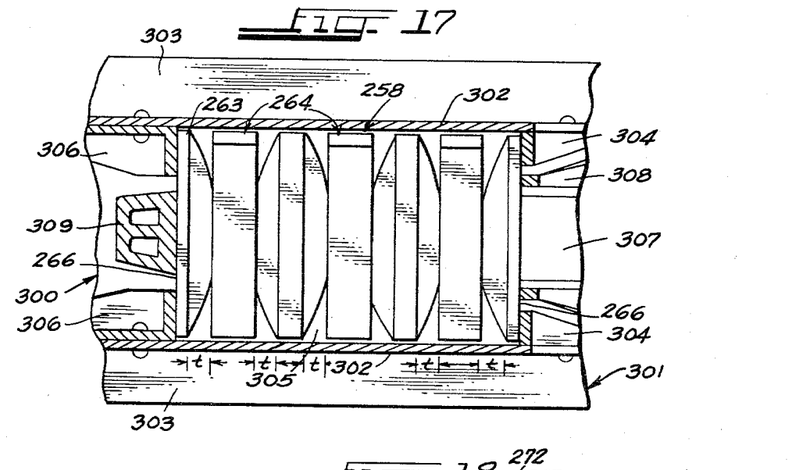
FIG. 17 is a top plan sectional view of the draft end of a center sill showing a second embodiment of a shock absorbing device employed as a draft gear.
Figure 18:
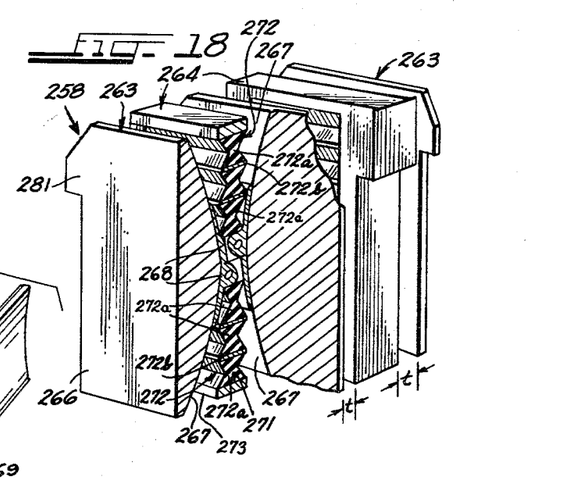
FIG. 18 is an isometric view of a shock absorbing devide partially in section embodying the principles of the device shown in FIG. 17 but showing only two sets of friction faces and two coacting friction wedge assemblies.
Figure 19:
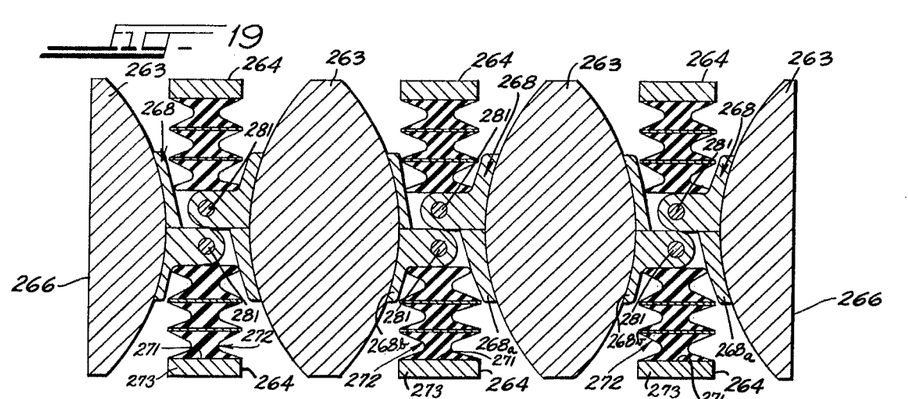
FIG. 19 is a vertical cross-sectional view taken through the shock absorbing device employed in FIG. 17 showing the device in its extended position.
Figure 20:
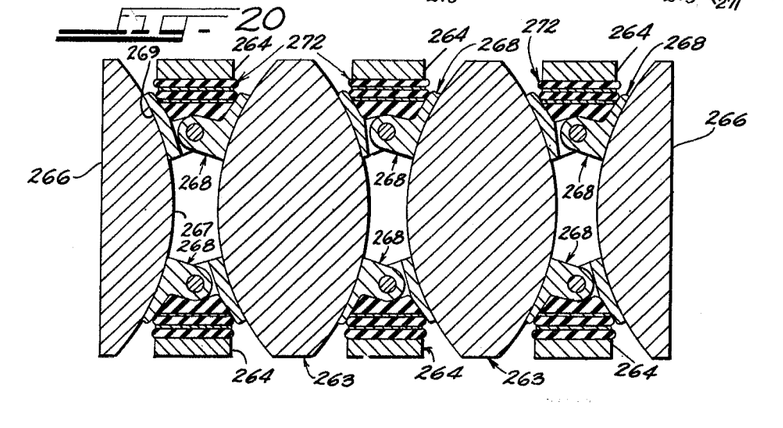
FIG. 20 is a vertical cross-sectional view similar to FIG. 19, but showing the device in its contracted position.
Figure 21:
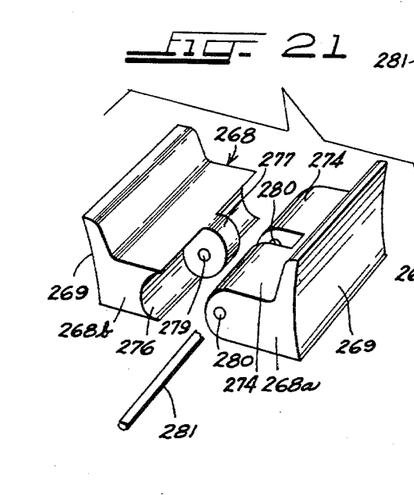
FIG. 21 is an exploded view of the friction wedge unit.

Referring now to FIG. 17 the shock absorbing unit 253 of the present invention is shown employed as a draft gear for connecting a coupler mechanism 300 to the center or draft sill 301 of a railway car. The sill 301 may be of substantially conventional construction, such as a Z-26 center sill, having side walls 302 depending from a horizontal top flange, not shown. Extending outwardly from the bottom end of the side walls 302 are horizontal flanges 303 across which there extends and is detachably fastened a bottom retainer plate, not shown, for supporting the shock absorbing unit 253 within the pocket. The draft gear pocket 305 is defined at its ends by longitudinally spaced front and rear draft lugs 304—304 and 306—306, fixed to the side walls 302.

Extending between the front draft lugs 304—304 and abutting the follower surfaces 266 of the shock absorbing device 253 is the coupler shank 307 which is connected in the well known manner to a yoke 308 which extends through the length of the pocket 305 between the front and rear draft lugs 304—304 and 306—306 such that the bight portion 309 thereof contacts the follower surface 266 of the rear friction shoe.

While the shock absorbing unit 253 illustrated is of the friction wedge type having substantially constant-force travel closure characteristics, it is to be understood that the shock absorbing unit illustrated in FIGS. 12 to 16 may also be employed. However, as previously described herein, the shock absorbing means 58 of the embodiment of FIGS. 12 to 16 does not have the substantially constant force-travel closure characteristics, otherwise the operation of the shock absorbing units are identical.

Assuming as shown in FIG. 17 the coupler is subject to buff impact, this causes the coupler shank 307 contacting the follower surface 266 to move the front shoe rearward toward the rear draft lugs 306—306. The rear friction shoe of which the follower surface 266 contacts the rear stop lugs 306—306 is held stationary so that the impact force transmitted to the shock absorbing unit tends to compress the latter. As heretofore described, the rubber biasing pads 272 are constructed to preclude the relative movement until the magnitude of the impact force is a selected value, for example, a value of about 400,000 lbs. Thus, in the event that the impact force is less than 400,000 lbs., the shock absorbing device 253 remains stationary and inoperative.

When the force exceeds 400,000 lbs., the rubber springs 272 are yieldable so that the friction wedge units 268 are transversely displaced and the friction shoes 263 move longitudinally toward each other to a compressed position. In this manner the friction forces at the contacting faces 267 and 269 and the resisting forces of the rubber springs 272 are operative to absorb a portion of the energy of impact as heretofore described. Upon dissipation of the impact energy the rubber springs 272 are operative to return the friction wedges 268 and friction shoes 263 to their neutral position.

It is, of course, readily apparent that an impact force in draft results in a similar action with the exception that the yoke 308 is operative to compress the unit against the front draft lug 304—304.

What is claimed is:

1. In a cushion underframe railway car comprising an underframe, a sliding sill, including a pair of longitudinally spaced sill sections movable relatively to each other and said underframe from a spaced neutral position upon application of an impact force, a cushion device interposed between said underframe and said sliding sill and having a predetermined travel, means connecting said sill sections including stress relieving shock absorbing means having a travel less than said travel of said cushion device mounted to interact with said sill sections to relieve the impact stresses through the length of said sliding sill, means rendering said cushion device operative simultaneously with travel of said stress relieving shock absorbing unit, said stress relieving shock absorbing means including means restraining said shock absorbing means against travel below a predetermined magnitude of impact force whereby said sill sections remain in said spaced neutral position and releasing said shock absorbing device to travel above said predetermined magnitude impact force to permit said sill sections to move relatively to each other from said neutral position, said sections upon termination of the travel of said stress relieving shock absorbing means being conjointly movable relative to said underframe for the remainder of the travel of said cushion device.

2. The invention as defined in claim 1 wherein said shock absorbing means comprises a plurality of longitudinally spaced friction shoes movable longitudinally relatively to each other between an extended spaced position and a contracted spaced position, and friction wedge means having planar friction faces inclined complementary to the friction faces on said friction shoes, said friction wedge means being disposed on opposite sides of a central longitudinal plane and between the respective pairs of friction shoes, and predeterminately loaded spring means transversely biasing said friction wedge means towards said longitudinal plane so as to maintain said device extended until a shock force longitudinally imposed upon said friction faces exceeds the predetermined load on said spring means.

3. The invention as defined in claim 2 wherein said friction shoes and said friction wedges are provided with opposing inclined planar friction faces, said inclined friction faces and friction wedges being variably inclined so as to provde a substantially constant force travel characteristic.

4. The invention as defined in claim 3 wherein said friction faces on said friction shoes and said friction wedges are arcuately curved.

5. In a cushion underframe railway car comprising an underframe, a sliding sill mounted for lengthwise movement on said underframe, a cushion device interposed between said sliding sill and said underframe for protecting the lading and the car body from damage, said sliding sill including a pair of sections longitudinally movable relatively to each other from a spaced neutral position upon application of a buff or draft impact, a shock absorbing means for relieving the stresses through the length of the sliding sill, said shock absorbing means having a lesser travel than said cushion device and being separate from said cushion device and mounted for movement with one of said relatively movable sill sections, and interconnecting means mounted for movement with the other of said sill sections interconnecting said sill sections, said interconnecting means embracing said shock absorbing device and engaging said cushion device so that said shock absorbing means and said cushion device are simultaneously activated to relieve the stresses through the length of said sliding sill during travel of said shock absorbing means, said shock absorbing means including means precluding travel of said shock absorbing means below a predetermined magnitude of impact force and thereby retaining said sill sections in said spaced neutral position, said sill sections being conjointly movable relative to said underframe when said travel of said shock absorbing device is restrained or terminated so that said cushion device is operative to provide lading and car body protection.

6. A shock absorbing device comprising a plurality of longitudinally spaced friction shoes movable longitudinally relatively to each other between an extended space position and a contracted position, said friction shoes having pairs of opposing arcuate friction faces arranged on opposite sides of a central longitudinal plane, friction wedge means disposed on opposite sides of said central longitudinal plane between the respective pairs of friction faces having arcuate friction faces inclined complementary to said friction shoe faces, and predetermined loaded spring means transversely biasing said wedge means toward said longitudinal plane so as to maintain said device extended until the shock force imposed thereon exceeds a predetermined value.

7. The invention as defined in claim 5 wherein said shock absorbing means includes a friction energy absorbing arrangement and wherein said means resisting movement comprises resilient means applying a biasing force precluding said friction means from becoming operative until said impact force exceeds a predetermined value.

8. The invention as defined in claim 5 wherein said shock absorbing means includes a plurality of pairs of longitudinally spaced friction shoes movable longitudinally relative to each other between an extended spaced position and a contracted position, said friction shoes having pairs of opposing sloped friction faces arranged on opposite sides of a central longitudinal plane, and friction wedge means having planar friction faces sloped complementary to said friction faces, said friction wedge means being disposed on opposite sides of said central longitudinal plane and between the respective pairs of said opposing friction faces, and wherein said means resisting movement includes predeterminately load resilient spring means transversely biasing said friction wedge means toward said longitudinal plane so as to maintain said shock absorbing device in an extended inoperative position until the shock force longitudinally imposed thereon exceeds said predetermined value.

9. The invention as defined in claim 8 wherein said friction shoes and friction wedge means friction faces are formed as an inclined plane.

10. The invention as defined in claim 9 wherein said friction shoes and friction wedge means friction faces are formed as an arcuate surface to provide a substantially constant resisting force.

References Cited by the Examiner
UNITED STATES PATENTS

| | | | |
|---|---|---|---|
| 1,576,722 | 3/26 | Cotton | 213—38 |
| 1,648,320 | 11/27 | O'Connor | 213—38 |
| 1,692,689 | 11/28 | O'Connor | 213—39 |
| 1,997,170 | 4/35 | Egan | 213—8 |
| 2,051,024 | 8/36 | Barrows | 213—39 |
| 2,064,891 | 12/36 | Egan | 213—8 |
| 2,401,905 | 6/46 | Bureau | 213—34 |
| 2,456,635 | 12/48 | Heater | 267—9 |
| 2,623,743 | 12/52 | Mulcahy | 267—9 |
| 2,803,353 | 8/57 | Meyer et al. | 213—8 |

LEO QUACKENBUSH, *Primary Examiner.*